United States Patent [19]

Dreisinger et al.

[11] Patent Number: 5,366,715
[45] Date of Patent: Nov. 22, 1994

[54] METHOD FOR SELECTIVELY REMOVING ANTIMONY AND BISMUTH FROM SULPHURIC ACID SOLUTIONS

[75] Inventors: David B. Dreisinger, Delta; Brenna J. Y. Leong, Vancouver, both of Canada

[73] Assignee: The University of British Columbia, Vancouver, Canada

[21] Appl. No.: 138,024

[22] Filed: Oct. 19, 1993

[51] Int. Cl.$^5$ .................. C01B 17/90; C02F 1/42; C25C 1/14
[52] U.S. Cl. .................... 423/531; 204/106; 204/DIG. 13; 210/688; 210/912; 423/87
[58] Field of Search .............. 423/87, 531; 204/106, 204/DIG. 13; 210/688, 912

[56] References Cited

U.S. PATENT DOCUMENTS

| | | | |
|---|---|---|---|
| 4,124,460 | 11/1978 | Loutfy et al. | 204/108 |
| 4,501,666 | 2/1985 | Ogata et al. | 423/531 |
| 4,559,216 | 12/1985 | Nagai et al. | 423/531 |
| 5,039,496 | 8/1991 | Kehl et al. | 423/87 |
| 5,273,660 | 12/1993 | Breuning et al. | 210/688 |

FOREIGN PATENT DOCUMENTS

| | | | |
|---|---|---|---|
| 2090062 | 8/1993 | Canada | C22B 3/38 |
| 61-128421 | 8/1986 | Japan | 423/87 |

OTHER PUBLICATIONS

Sasaki et al., "Hydrometallurgy and metallurgy of copper", vol. III, 1991, 245–254 no month.

*Primary Examiner*—Gary P. Straub
*Attorney, Agent, or Firm*—Fitzpatrick, Cella, Harper & Scinto

[57] ABSTRACT

The present invention is concerned with a method for selectively removing antimony and bismuth from an impure sulphuric acid solution containing at least 50 g/L of acid and some concentration of ferric ion (for example copper refinery electrolyte), is disclosed. The method involves contacting the impure solution with a sufficient quantity of finely divided metallic copper so as to prereduce all ferric ion present in the solution to the ferrous oxidation state. The prereduced solution is then contacted with a chelating resin. The method avoids the deleterious loading of ferric iron onto the ion exchange resin and prevents the return of excessive amounts of chloride ion with the purified electrolyte.

12 Claims, No Drawings

METHOD FOR SELECTIVELY REMOVING ANTIMONY AND BISMUTH FROM SULPHURIC ACID SOLUTIONS

FIELD OF THE INVENTION

The present invention is concerned with a method for purifying concentrated sulphuric acid solutions, in particular a copper refinery electrolyte, by selectively removing antimony and bismuth ions from the solution through adsorption on a solid ion exchange resin.

BACKGROUND OF THE INVENTION

During the electrorefining of copper, impure copper anodes are electrochemically dissolved in an aqueous solution containing copper sulphate and sulphuric acid. At the same time, at the cathode, pure copper is deposited and subsequently recovered from the electrorefining cell. The objective of refining is to make a separation between impurities contained in the anode and final copper cathode product. Some impurities such as gold and silver are retained as a solid product, referred to as "slime", and subsequently physically recovered from the anode residue. Impurities like antimony and bismuth are partly collected in the solid product and partly dissolve into the copper sulphate-sulphuric acid solution.

Small concentrations of antimony and bismuth impurities, as well as others, in the copper sulphate-sulphuric acid solutions can be tolerated up to a certain level. However, if allowed to increase in concentration past refinery specific limits, the copper cathode product will be contaminated with excessive amounts of antimony and bismuth. Additionally iron present in the impure copper anode will dissolve in the solution. Small concentrations of iron in the copper sulphate-sulphuric acid solution do not result in contamination of the copper cathode product. Iron is present in two oxidation states, ferrous ($Fe^{2+}$) and ferric ($Fe^+$). The steady state levels of these impurities in refinery electrolyte vary depending on the composition of the copper anodes being treated and the specific refinery operating conditions. However, typical levels are of the order of 0.2–0.5 g/L for antimony, 0.1–0.6 g/L for bismuth and 0.2–2.0 g/L for iron.

In order to control the build-up of impurity ions in solution, refineries generally employ a purification process to remove the deleterious impurities. The process usually involves a multi-step electrolytic deposition of copper. As copper is depleted, antimony and bismuth, as well as arsenic, begin to co-deposit with the copper product. The contaminated copper product is then recovered and recycled for copper recovery. The solution, after substantial depletion of copper, antimony, arsenic and bismuth may then be subjected to further purification, for example, by evaporative crystallization. The purified solution is then returned to the copper refinery. The disadvantages of the electrolytic purification process are numerous. In particular, the process is energy intensive, an impure copper by-product is produced, and under certain conditions, toxic arsine gas may be evolved.

Alternate methods to replace the conventional electrolytic purification process have been proposed. For example, in the so-called Boliden process disclosed in U.S. Pat. No. 3,753,877, arsenic ion is added to the electrolyte to effect an impurity removal. Unfortunately, the required arsenic addition is detrimental to electrolysis. The Nordeutsche Process described in U.S. Pat. No. 3,696,012 involves contacting the impure copper refinery electrolyte with a B-Stannic acid adsorbent. However, B-Stannic acid is expensive and soluble in the electrolyte. Therefore, this method is not economical because of the excessive loss of reagent.

Solvent extraction processes for antimony and bismuth ions removal have also been reduced to practice. For example, the solvent 2EHAPO$_4$, a mixture of di-2-ethylhexylphosphoric acid and mono-2-ethylhexyphosphoric acid, can be used to extract both antimony and bismuth out of copper refinery electrolyte. However, the extraction is only possible with low efficiency.

Ion exchange resins have been developed to selectively remove impurities from copper refinery electrolytes. For example, Nagai et al. in U.S. Pat. No. 4,559,216 reports the use of a chelating ion exchange resin possessing imino bis methylene phosphonic acid groups on a phenol resin matrix for the removal of antimony and bismuth from electrolyte. However, this method suffers from the strong extraction of ferric ion from copper refinery electrolyte. The loading of ferric ion tends to limit the capacity of the resin and hence the efficiency of the antimony and bismuth removal process. Ferric ion also elutes more slowly than antimony and bismuth when eluting with 6 mol/L HCl, resulting in a progressive poisoning of the ion exchange material in the long run. The antimony and bismuth containing eluant is also contaminated with large mounts of iron. A further disadvantage of this process is the possible release of excessive amounts of chloride ion from the hydrochloric acid eluant back into the copper electrorefinery circuit. Excessive amounts of chloride interfere with the electrodeposition process and result in a poor quality cathode copper and/or precious metal losses.

Alternate resin products have also been reported to be efficient at antimony and bismuth removal from copper electrolyte. For example, the use of Eporous MX-2 ion exchange resin which contains aminomethylene phosphonic acid functional groups on a polystyrene-divinylbenzene matrix has been reported by Sasaki in *Hydrometallurgy and Metallurgy of Copper*, 1991, volume III, 245–254. The use of the resin DUOLITE TM C-467, which contains aminomethylenephosphonic acid functional groups on a polystyrene divinylbenzene matrix, is also known in the art for impurity removal.

Accordingly, there is a great need to improve methods for the purification of sulphuric acid solution, especially in the field of electrorefining of copper. Such method would allow the selective removal of antimony and bismuth ions avoiding the iron poisoning problems and the chloride associated problems encountered in the operation of the ion exchange method for impurity removal.

SUMMARY OF THE INVENTION

In accordance with the present invention, there is now provided a method for the purification of sulphuric acid solutions by selectively removing antimony ions and bismuth ions present therein. More specifically, the invention comprises the efficient removal of antimony ions and bismuth ions from sulphuric acid solutions such as copper refinery electrolyte by first prereducing the ferric ions present in the solution to ferrous ions by contact with a copper metal reductant, followed by contacting the reduced solution with a solid ion exchanger. In a preferred embodiment, the ion exchange resin possesses methylene phosphonic acid functional groups.

In an aspect of the present invention, a second contact between the purified solution and a copper metal reductant is achieved, to prevent the return of excessive amounts of chloride ion to the electrorefining circuit.

Therefore, the method the present invention allows a quick, simple and efficient purification of highly concentrated sulphuric acid solution such as copper electrolyte, containing the impurity ions of antimony, bismuth and iron, and avoids environmental problems and any adverse impact on the copper refining operation.

DETAILED DESCRIPTION OF THE INVENTION

The preferred ion exchange resin for the purpose of the present invention contains at least one aminomethylene phosphonic acid group substituted for part or all of the hydrogen atoms of an alkylamine group incorporated as a chelate forming group of the resin matrix. This species will be referred to as "aminomethylene phosphonic acid group" hereinafter.

The matrix of the ion exchange resin include phenolic resins, such as phenol-aldehyde resins, polystyrene-divinylbenzene copolymer resins, and the like. The polystyrene divinylbenzene resin is preferred to the phenolic resins because of its greater selectivity for antimony and bismuth ions over ferric iron ions. Good results are nevertheless obtained with phenolic resins. The most preferred resin is the polystyrene-divinylbenzene chelating resin containing the aminomethylene phosphonic acid functional group (DUOLITE ™ C-467). Other resins and matrix suitable for the purposes of the present invention are disclosed in U.S. Pat. No. 4,559,216, which is hereby incorporated by reference.

The method of the present invention is suitable for the purification of sulphuric acid solutions containing antimony and/or bismuth ions and ferric ions. The sulphuric acid concentration should preferably be of at least 50 g/L efficient operation of the invention, but the method is also applicable for concentrations below that level. Impure sulphuric acid solutions may further contain ions such as copper, nickel, cobalt and arsenic. A typical example of such a solution is a copper refinery electrolyte. Using the method of the present invention, it becomes possible to efficiently remove antimony and bismuth ions out of the electrolyte.

Besides copper refinery electrolytes, it is possible to use this invention to purify solutions from which copper sulphate crystals are to be recovered, sulphuric acid solutions obtained through leaching of a metal containing material, such as concentrate, ore, matte, speiss or electrodeposit, waste sulphuric acid solutions and raffinates obtained from solvent extraction purification of copper refinery electrolytes, for example, arsenic solvent extraction with tributylphosphate.

The method of the present invention can be carried out batchwise or continuously, the latter being preferred. The prereduction step is preferably accomplished by filling a column contactor with chopped copper wire scrap of reasonably high purity, preferably above 99%. The prereduction may also be carried out differently with other reagents, for example, zinc or nickel metal reduction; gaseous reduction with sulphur dioxide; inorganic reductant like $AsO_3$ or organic reductant like oxalic acid, and the like. However, all these prereduction reagents may introduce additional impurities in the sulphuric acid solution which will may cause problems later in the method. Accordingly, copper metal reduction is preferred because of its efficiency and the simplicity of the prereduction step without introducing further impurities in the sulphuric acid solution.

Typically, the sulphuric acid solution containing Sb and/or Bi and Fe, is passes through the column containing the chopped copper wire scrap at a flowrate of about 0.1 to 100 BV/hour, preferably 1 to 10 BV/hour, at a temperature of 20° to 100° C. The term "BV" refers to bed volumes of solution, for example 1 BV/hour of solution passing through a column of copper wire cuttings of a volume of 1 cubic meter corresponds to a solution flowrate of 1 cubic meter/hour. After the reduction step has been completed to reduce nearly all ferric ions to ferrous ions, the sulphuric acid solution may then be contacted with the ion exchange resin. The ion exchange step is accomplished, for example, by filling a column contactor with the polystyrene-divinylbenzene chelating resin and passing the prereduced sulphuric acid solution containing Sb and/or Bi through the column at a flowrate of about 0.1 to 100 BV/hour, preferably 1 to 10 BV/hour at a temperature of 20° to 100° C. The contact of the sulphuric acid solution with copper wire cuttings or ion exchange resin can be accomplished using either an upward or downward flow of solution through the column.

The method of the present invention can be illustrated as follows: An impure copper refinery electrolyte, generally containing 160–200 g/L of free sulphuric acid, 0.1 to 0.5 g/L Sb ion, 0.1 to 0.6 g/L Bi ion and 0.2 to 2.0 g/L Fe ion, is continuously and sequentially passed through a column of copper wire cuttings and a column of polystyrene-divinylbenzene chelating resin possessing aminomethylene phosphonic acid functional groups. Considering the above concentration of Sb, Bi and Fe, the corresponding amount of Sb, Bi and Fe ions adsorbed on the resin fall in the range of 5 to 20 g/L of resin, 5 to 20 g/L of resin and less than 1 g/L, respectively. Obviously, the amount adsorbed is variable according to the specific concentration of the antimony and bismuth ions in the original solution. The amount of iron ions adsorbed is independent of the original iron concentration in solution.

After washing with water to remove entrained copper refinery electrolyte, the elution of the loaded antimony and bismuth ions from the ion exchange resin is generally accomplished with an aqueous solution of hydrochloric acid, though other suitable eluting solutions may be used. In the case of hydrochloric acid, the acid concentration should exceed 2M, and preferably between 5 and 7M. As in the case of resin loading, the contact between the hydrochloric acid eluant and the loaded resin can be carried out in either batchwise or continuously, a continuous column contactor being preferred. The total volume of eluant necessary to remove antimony and bismuth ions is 1 to 10 L per L of resin. The elution temperature is kept in the range 10° to 60° C., preferably 20°–30° C. The eluant flowrate should be 0.1 to 10 BV/hour, preferably 1–2 BV/hour.

After elution, the resin is washed with water, prior to contact with more prereduced sulphuric acid solution containing antimony and bismuth ions. The washing of the resin is critical to prevent excessive amounts of chloride from returning to the copper refinery electrolyte. An additional feature of the method of the present invention comprises the contact of the purified sulphuric acid solution with a copper metal material of high specific surface area. The copper metal material advantageously precipitates excessive amounts of chloride from the sulphuric acid solution as the sparingly soluble cuprous chloride salt. The chloride removal step is accomplished, for example, by filling a column contactor with chopped wire scrap and passing the purified sulphuric acid solution through the column at a flowrate of 0.1 to 100 BV/hour, preferably 1 to 10 BV/hour, at a temperature of 20° to 100° C.

When a purified copper refinery electrolyte containing 160-200 g/L of free sulphuric acid, 25 to 50 g/L Cu ion, 1 g/L chloride ion and 0.2 to 2.0 g/L Fe (ferrous) ion is continuously passed through a column of copper wire cuttings in accordance with the present invention, the amount of chloride ions remaining in the solution declines to about 0.03-0.1 g/L. The residual amount is obviously variable according to the specific concentration of copper and other ions in the original solution.

The recovery of antimony and bismuth from the hydrochloric acid eluant is accomplished by a number of processes including distillation of hydrochloric acid, neutralization of the acid with a suitable base, hydrogen sulphide precipitation of bismuth and antimony sulphide, or by a conventional solvent extraction or ion exchange procedure.

This method of the present invention allows for the efficient removal of antimony and bismuth ions from impure aqueous solutions of sulphuric acid. The problem of iron contamination on the ion exchange resin is avoided by prereducing all the ferric ion present in the sulphuric acid solution to ferrous ion by contact with a copper metal reductant. The loading capacity and the efficiency of the ion exchange material are therefore maintained. The problem of chloride ion entrainment in the purified acid solution is overcome by a second contact with a copper metal reductant. This contact efficiently suppresses the chloride ion concentration in the purified solution by formation of the sparingly soluble cuprous chloride salt, thereby preventing the return of excessive amounts of chloride to the copper electrorefinery circuit.

The following examples are provided to illustrate the present invention rather than limit its scope.

EXAMPLE 1

Through a column, packed with 100 g of free copper wire cuttings is passed 2.5 L of a solution containing 42 g/L of Cu, 160 g/L of free sulphuric acid, 0.2 g/L of Bi, 0.27 g/L of Sb, 0.21 g/L of Fe and 3.2 g/L of As at a temperature of 25° C. and a flowrate of 10 BV/hour. The reduced solution, taking precautions to prevent air exposure, is then passed through a column containing 25 mL of a chelating resin (DUOLITE TM C-467 manufactured and sold by Rohm and Hass) at a temperature of 50° C. and a flowrate of 10 BV/hour.

The solution collected after passing through the copper column and the ion exchange column contains 42 g/L of Cu, 160 g/L of free sulphuric acid, 0.06 g/L of Bi, 0.06 g/L of Sb, 0.21 g/L of Fe and 3.2 g/L of As.

As evidenced by these results, substantially all the antimony and bismuth ions are selectively extracted from the sulphuric acid solution with negligible extraction of the other impurities.

EXAMPLE 2

Through a column packed with 100 g of fine copper wire cuttings was passed 2.5 L of a solution containing 42 g/L of Cu, 160 g/L of free sulphuric acid, 0.2 g/L of Bi, 0.27 g/L of Sb, 0.21 g/L of Fe and 3.2 g/L of As at a temperature of 25° C. and a flowrate of 10 BV/hour. The reduced solution, taking precautions to prevent exposure to the air, was then passed through a column containing 25 mL of a chelating resin (UR-3300 TM manufactured and sold by Unitika Ltd.) at a temperature of 50° C. and a flowrate of 10 BV/hour.

The solution collected after passing through the copper column and the ion exchange column was found to contain 42 g/L of Cu, 160 g/L of free sulphuric acid, 0.11 g/L of Bi, 0.11 g/L of Sb, 0.21 g/L of Fe and 3.2 g/L of As. In this experiment, bismuth and antimony are again selectively extracted out of the sulphuric acid solution with negligible extraction of the other impurities.

COMPARATIVE EXAMPLE 1

Through a column packed with 25 mL of a chelating resin (DUOLITE TM C-467) is passed 2.5 L of a solution containing 42 g/L of Cu, 160 g/L of free sulphuric acid, 0.2 g/L of Bi, 0.27 g/L of Sb, 0.21 g/L of Fe and 3.2 g/L of As at a temperature of 50° C. and a flowrate of 10 BV/hour.

The solution collected after passing through the copper column and the ion exchange column contains 42 g/L of Cu, 160 g/L of free sulphuric acid, 0.12 g/L of Bi, 0.11 g/L of Sb, 0.15 g/L of Fe and 3.2 g/L of As.

These results show that iron is co-extracted onto the resin while antimony and bismuth are extracted from the sulphuric acid solution. The co-extraction of iron significantly reduces the efficiency of the ion exchange process.

COMPARATIVE EXAMPLE 2

Through a column packed with 25 mL of a chelating resin (UR-3300 TM) is passed 2.5 L of a solution containing 42 g/L of Cu, 160 g/L of free sulphuric acid, 0.2 g/L of Bi, 0.27 g/L of Sb, 0.21 g/L of Fe and 3.2 g/L of As at a temperature of 50° C. and a flowrate of 10 BV/hour.

The solution collected after passing through the copper column and the ion exchange column contains 42 g/L of Cu, 160 g/L of free sulphuric acid, 0.14 g/L of Bi, 0.18 g/L of Sb, 0.10 g/L of Fe and 3.2 g/L of As. Again, iron is co-extracted onto the resin while antimony and bismuth are extracted from the sulphuric acid solution.

EXAMPLE 3

5 L of an aqueous solution containing 150-160 g/L sulphuric acid, 40-45 g/L Cu, 3.0-3.5 g/L As, 0.30 g/L Sb, 0.15 g/L Bi, 0.34 g/L Fe, 15 g/L Ni is fed downflow at a flowrate of 10 BV/hour (1 BV=25 ml) through a thermostatted column containing 25 mL of copper wire cuttings (average weight=100 g) at 60° C. After passing the copper electrolyte through the packed bed of wire cuttings, the solution is then passed through a thermostatted column packed with 25 mL of a phenolic chelating resin (UR-3300 TM) containing imino bis methylenephosphonic acid as a ligand at 10 BV/hour and 60° C.

After passage through the copper wire column and the resin column, the electrolyte was found to contain 40–45 g/L Cu, 3.0–3.5 g/L As, 0.17–0.20 g/L Sb, 0.13–0.14 g/L Bi, 0.30 g/L Fe and 15 g/L nickel. This indicates that antimony ions and bismuth ions are selectively adsorbed on the chelating resin, but very little iron is adsorbed. The bed of copper wire cuttings is effective in the prereduction of iron in the copper electrolyte.

The column is then washed upflow with deionised water at 10 BV/hour at 25° C. for 4 BV before elution. 6M hydrochloric acid is used to elute the metal ions adsorbed on the resin. The eluant is passed downflow through the resin bed at 2 BV/hour and 25° C. and the eluates were collected at the bottom of the column for up to 10 BV. Following elution, the column is again washed upflow with deionised water at 10 BV/hour at 25° C. for 4 BV.

Twenty cycles of impurity removal were conducted on the above mentioned copper electrolyte. Each cycle consisted of four steps:

1) passing 200 BV (or 5 L) of copper electrolyte through the resin bed;
2) washing the resin with deionised water;
3) elution from the resin using 6M HCl for 10 BV; and
4) washing the resin with deionised water.

Analysis of the eluants produced in each cycle test demonstrated selective removal of antimony and bismuth from the electrolyte with minimal iron adsorption on the resin. The results are shown in Table 1.

TABLE 1

| | Total metal eluted per cycle | | |
| | Metal Eluted (g/L resin) | | |
| Cycle | Sb | Bi | Fe |
| --- | --- | --- | --- |
| 1 | 14.34 | 5.29 | 0.11 |
| 2 | 14.84 | 6.38 | 0.07 |
| 3 | 12.57 | 4.28 | 0.10 |
| 4 | 13.85 | 4.76 | 0.02 |
| 5 | 11.67 | 3.85 | 0.01 |
| 6 | 13.12 | 2.48 | 0.03 |
| 7 | 12.55 | 3.42 | 0.04 |
| 8 | 11.84 | 4.37 | 0.00 |
| 9 | 11.15 | 4.58 | 0.00 |
| 10 | 11.25 | 4.25 | 0.00 |
| 11 | 10.97 | 3.92 | 0.23 |
| 12 | 11.09 | 3.76 | 0.11 |
| 13 | 10.57 | 3.83 | 0.06 |
| 14 | 10.03 | 3.91 | 0.03 |
| 15 | 10.34 | 3.67 | 0.09 |
| 16 | 10.39 | 3.95 | 0.09 |
| 17 | 10.26 | 3.60 | 0.06 |
| 18 | 10.27 | 3.55 | 0.06 |
| 19 | 10.66 | 3.06 | 0.04 |
| 20 | 11.71 | 3.43 | 0.04 |

EXAMPLE 4

According to the method of example 3, antimony and bismuth are removed from sulphuric acid solutions having a composition similar to that in Example 3, but the metal adsorption is achieved by using the DUOLITE ™ C-467 instead of UR-3300 ™. DUOLITE ™ C-467 is a styrenic resin containing aminophosphonic acid groups. The metal elution results from twenty test cycles are shown in Table 2.

TABLE 2

| | Total metal eluted per cycle | | |
| | Metal Eluted (g/L resin) | | |
| Cycle | Sb | Bi | Fe |
| --- | --- | --- | --- |
| 1 | 11.60 | 12.09 | 0.15 |
| 2 | 11.01 | 10.62 | 0.08 |
| 3 | 10.65 | 7.01 | 0.03 |

TABLE 2-continued

| | Total metal eluted per cycle | | |
| | Metal Eluted (g/L resin) | | |
| Cycle | Sb | Bi | Fe |
| --- | --- | --- | --- |
| 4 | 12.17 | 6.18 | 0.00 |
| 5 | 11.00 | 5.49 | 0.01 |
| 6 | 13.02 | 6.98 | 0.01 |
| 7 | 13.43 | 7.88 | 0.00 |
| 8 | 13.07 | 6.89 | 0.00 |
| 9 | 12.46 | 7.62 | 0.00 |
| 10 | 12.79 | 7.79 | 0.00 |
| 11 | 12.06 | 7.61 | 0.02 |
| 12 | 12.20 | 7.94 | 0.06 |
| 13 | 11.98 | 9.37 | 0.00 |
| 14 | 11.23 | 7.26 | 0.02 |
| 15 | 12.05 | 7.32 | 0.05 |
| 16 | 11.65 | 8.18 | 0.09 |
| 17 | 12.70 | 8.09 | 0.07 |
| 18 | 12.08 | 8.23 | 0.04 |
| 19 | 11.51 | 8.03 | 0.04 |
| 20 | 14.08 | 9.98 | 0.06 |

EXAMPLE 5

According to the method of example 3, antimony and bismuth are removed from sulphuric acid solutions having a composition similar to that in Example 3, but the electrolyte did not pass through a column of copper wire cuttings prior to solution purification through the resin bed. Metal adsorption is achieved by using the UR-3300 ™ resin. The metal elution results from twenty test cycles are shown in Table 3.

TABLE 3

| | Total metal eluted per cycle | | |
| | Metal Eluted (g/L resin) | | |
| Cycle | Sb | Bi | Fe |
| --- | --- | --- | --- |
| 1 | 9.96 | 2.56 | 5.16 |
| 2 | 8.69 | 2.28 | 5.26 |
| 3 | 8.62 | 1.98 | 6.31 |
| 4 | 8.79 | 1.80 | 6.53 |
| 5 | 7.35 | 1.86 | 6.17 |
| 6 | 7.85 | 2.63 | 6.55 |
| 7 | 7.27 | 1.66 | 6.77 |
| 8 | 7.43 | 1.75 | 6.75 |
| 9 | 6.60 | 1.76 | 6.44 |
| 10 | 6.45 | 1.69 | 8.51 |
| 11 | 6.58 | 1.75 | 8.68 |
| 12 | 5.82 | 1.48 | 7.30 |
| 13 | 5.84 | 1.50 | 7.34 |
| 14 | 6.20 | 1.78 | 7.08 |
| 15 | 7.40 | 2.00 | 7.62 |
| 16 | 5.74 | 1.46 | 6.73 |
| 17 | 5.29 | 1.13 | 6.05 |
| 18 | 5.23 | 1.37 | 6.28 |
| 19 | 5.73 | 1.28 | 6.50 |
| 20 | 6.12 | 1.28 | 7.11 |

EXAMPLE 6

According to the method of example 4, antimony and bismuth are removed from sulphuric acid solutions having a composition similar to that in Example 3, but the electrolyte did not pass through a column of copper wire cuttings prior to contact through the resin column. As in Example 5, metal adsorption was achieved by using the DUOLITE ™ C-467 resin. The metal elution results from twenty test cycles are shown in Table 4.

TABLE 4

| | Total metal eluted per cycle | | |
| --- | --- | --- | --- |
| | Metal Eluted (g/L resin) | | |
| Cycle | Sb | Bi | Fe |
| 1 | 9.28 | 7.64 | 0.54 |
| 2 | 7.95 | 6.10 | 0.81 |
| 3 | 8.61 | 3.74 | 0.97 |
| 4 | 9.03 | 3.52 | 1.07 |
| 5 | 7.95 | 3.06 | 1.10 |
| 6 | 9.30 | 4.41 | 1.11 |
| 7 | 9.52 | 4.31 | 1.14 |
| 8 | 9.85 | 4.43 | 1.17 |
| 9 | 9.94 | 4.85 | 1.24 |
| 10 | 9.88 | 5.30 | 1.62 |
| 11 | 10.80 | 5.54 | 1.61 |
| 12 | 9.90 | 5.60 | 1.67 |
| 13 | 9.82 | 5.08 | 1.36 |
| 14 | 10.01 | 4.45 | 1.39 |
| 15 | 10.55 | 5.41 | 1.44 |
| 16 | 10.13 | 5.42 | 1.43 |
| 17 | 9.09 | 4.74 | 1.33 |
| 18 | 9.42 | 5.46 | 1.34 |
| 19 | 10.53 | 5.87 | 1.40 |
| 20 | 11.15 | 6.13 | 1.57 |

EXAMPLE 7

1 L of an aqueous solution containing 150–160 g/L sulphuric acid, 40–45 g/L Cu, 3.0–3.5 g/L As, 0.30 g/L Sb, 0.15 g/L Bi, 0.34 g/L Fe, 15 g/L Ni, and 2.0 g/L chloride was fed downflow at a flowrate of 10 BV/hour through a thermostatted column containing 25 mL of copper wire cuttings (average weight=100 g) at 60° C. The solutions exiting the column were collected for 40 BV and analyzed for chloride content. The following results are presented in Table 5:

TABLE 5

| Chloride removal from copper electrolyte containing 2 g/L chloride* | | | | | |
| --- | --- | --- | --- | --- | --- |
| Sample (BV) | Time (Hours) | Chloride concentration (g/L) | Volume of Solution (mL) | Chloride removed (g) | % Chloride removed |
| 0 | 0.0 | 0.000 | 0.00 | 0.000 | 0.00 |
| 5 | 0.5 | 0.029 | 126.49 | 0.249 | 98.55 |
| 10 | 1.0 | 0.040 | 132.57 | 0.260 | 98.00 |
| 15 | 1.5 | 0.042 | 125.54 | 0.246 | 97.90 |
| 20 | 2.0 | 0.035 | 133.99 | 0.263 | 98.25 |
| 25 | 2.5 | 0.041 | 129.27 | 0.253 | 97.95 |
| 30 | 3.0 | 0.037 | 127.33 | 0.250 | 98.15 |
| 35 | 3.5 | 0.038 | 133.19 | 0.261 | 98.10 |
| 40 | 4.0 | 0.039 | 132.56 | 0.260 | 98.05 |

*Temperature of loading = 60° C. and copper wire column flowrate = 10 BV/hour

In view of the above results in Table 5, it is apparent that the chloride concentration can be reduced to very low values when the copper wire column is used to precipitate excess chloride ion as cuprous chloride. In this way, the breakthrough of harmful levels of chloride to the electrorefining process is prevented.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A method for the purification of sulphuric acid solutions having a sulfuric acid concentration of at least 50 grams per liter containing ferric ions and at least one of antimony ions and bismuth ions, which comprises:
   reducing the ferric ions to ferrous ions in the solution;
   selectively removing the antimony and bismuth ions by passing the reduced solution through an ion exchange resin;
   recovering purified sulphuric acid solution.

2. A method according to claim 1 wherein the ferric ions are reduced to ferrous ions by passing the sulphuric acid solution in a column containing a copper metal reductant.

3. A method according to claim 1 wherein the ion exchange resin comprises at least one aminomethylene phosphonic acid group substituted for part or all of the hydrogen atoms of an alkylamine group incorporated as a chelate forming group of the resin matrix.

4. A method according to claim 3 wherein the ion exchange resin is a phenolic resin or a polystyrene-divinylbenzene resin.

5. A method according to claim 1 wherein the sulphuric acid solution is selected from the group consisting of a copper refinery electrolyte, sulphuric acid solutions obtained through leaching of a metal containing material, ore matte, speiss or electrodeposit, waste sulphuric acid solutions and raffinates obtained from solvent extraction purification of copper refinery electrolytes.

6. A method according to claim 1 wherein the purified sulphuric acid solution is contacted with a copper metal reductant to remove the excess of chloride ion.

7. A method according to claim 1 wherein the reduction and the removal of antimony and bismuth are carried out in a column at a flowrate of 0.1 to 100 BV/hour and at a temperature of 20° to 100° C.

8. A method according to claim 3 wherein the methylene phosphonic acid functional groups is an aminomethylene phosphonic acid or an imino bis methylenephosphonic acid.

9. A method according to claim 1 wherein the sulphuric acid solution further comprises ions of copper, nickel, cobalt and arsenic.

10. A method according to claim 1 wherein the ion exchange resin is washed to recover antimony and bismuth adsorbed and regenerate the resin for additional uses.

11. A method according to claim 10 wherein washing is achieved with a chloride containing solution.

12. A method according to claim 11 wherein the chloride containing solution is a hydrochloric acid solution.

* * * * *